UNITED STATES PATENT OFFICE.

ADOLF BAEYER, OF MUNICH, GERMANY.

PROCESS FOR THE PRODUCTION OF ARTIFICIAL INDIGO.

SPECIFICATION forming part of Letters Patent No. 233,460, dated October 19, 1880.

Application filed April 6, 1880. (Specimens.)

*To all whom it may concern:*

Be it known that I, ADOLF BAEYER, doctor of philosophy and professor of chemistry in the University of Munich, in the Empire of Germany, have invented a new and useful Improvement relating to Materials used in the Manufacture of Artificial Indigo, which improvement is fully set forth in the following specification.

This invention relates to the production of orthonitrophenylpropiolic acid, which is to be used particularly in the synthetical formation of artificial indigo.

In carrying out my invention I convert orthonitrocinnamic acid into its dibrominated compound, which in chemical language may be called "orthonitrodibromohydrocinnamic acid," by direct treatment with liquid or gaseous bromine at an ordinary or at an elevated temperature, with or without the presence of suitable solvents. I then submit the product thus obtained to the action of alkalies, and by preference to the action of alcoholic potash, substantially in the manner following:

Orthonitrodibromohydrocinnamic acid is mixed with an equivalent proportion of alcoholic potash, or with an excess of the same, and the mixture is heated as long as any separation of bromide of potassium takes place. In the first stage of the process the nitrobromocinnamic acids are produced. The final result of the operation is orthonitrophenylpropiolic acid. The said compound may be further separated and purified by distilling off the alcohol, adding an excess of muriatic acid to the residual liquor, whereby crystalline flocks of the new acid are precipitated, filtering and crystallizing from alcohol or other suitable solvents.

Orthonitrophenylpropiolic acid is distinguished by the following characteristic properties: It is a white crystalline solid, easily soluble in alcohol, sparingly soluble in cold water. It is a strong organic acid, capable of forming salts with alkalies and salifiable bases. Its silver compound possesses fulminating properties and detonates strongly upon being heated.

Submitted to the action of suitable reducing or deoxidizing agents—such as, for instance, mixtures of glucose or milk-sugar with solutions of caustic or carbonated alkalies, or of alkaline earths—orthonitrophenylpropiolic acid is almost completely changed into indigo-blue. A mixture of the said substances, upon being gently heated, quickly turns blue, the coloring-matter separating out in its crystalline condition. The same characteristic change takes place in the interior of textile fiber or fabrics first impregnated with the above mixture of orthonitrophenylpropiolic acid, deoxidizing agents, and alkaline substances, and afterward submitted to the action of dry heat or of steam.

Compounds analogous to orthonitrophenylpropiolic acid may be obtained by employing in the above-described process homologues and substitution products of orthonitrocinnamic acid—such, for instance, as orthonitroparachlorocinnamic acid. Such products, however, form the subject-matter of separate applications for patents.

As above stated, orthonitrophenylpropiolic acid is used for the purpose of manufacturing artificial indigo.

I do not claim in this application the production of a dibrominated compound of orthonitrocinnamic acid, such product forming the subject-matter of a separate application for a patent.

What I claim as new, and desire to secure by Letters Patent, is—

1. As a new article of manufacture, orthonitrophenylpropiolic acid prepared from the dibrominated compound of orthonitrocinnamic acid, substantially as described, or by any other means which will produce a like result.

2. The within-described process for producing orthonitrophenylpropiolic acid from the dibrominated compound of orthonitrocinnamic acid, by treating the latter with alcoholic potash and heat, substantially as described.

In testimony that I claim the foregoing I have hereunto set my hand and seal this 24th day of March, 1880.

ADOLF BAEYER. [L. S.]

Witnesses:
GUSTAV SIEGLE,
HEINRICH CARO.